United States Patent
Leijon et al.

(10) Patent No.: US 8,704,396 B2
(45) Date of Patent: Apr. 22, 2014

(54) WAVE POWER UNIT WITH GUIDING DEVICE

(75) Inventors: Mats Leijon, Uppsala (SE); Andrej Savin, Uppsala (SE); Robert Leandersson, Västerås (SE); Rafael Waters, Uppsala (SE); Magnus Rahm, Uppsala (SE)

(73) Assignee: Seabased AB, Uppsala (SE)

( * ) Notice: Subject to any disclaimer, the term of this patent is extended or adjusted under 35 U.S.C. 154(b) by 0 days.

(21) Appl. No.: 13/700,571

(22) PCT Filed: May 28, 2010

(86) PCT No.: PCT/SE2010/050584
§ 371 (c)(1),
(2), (4) Date: Feb. 11, 2013

(87) PCT Pub. No.: WO2011/149396
PCT Pub. Date: Dec. 1, 2011

(65) Prior Publication Data
US 2013/0140824 A1 Jun. 6, 2013

(51) Int. Cl.
*F03B 13/10* (2006.01)
*F03B 13/12* (2006.01)
*H02P 9/04* (2006.01)
*B66D 3/08* (2006.01)

(52) U.S. Cl.
USPC .............................................. 290/53; 254/395

(58) Field of Classification Search
USPC ............................................ 290/53; 254/395
See application file for complete search history.

(56) References Cited

U.S. PATENT DOCUMENTS

| 16,992 | A | | 4/1857 | Osgood ......................... 254/395 |
| 522,524 | A | * | 7/1894 | Hook ............................. 114/101 |
| 1,525,837 | A | * | 2/1925 | Walker et al. ............. 242/157 R |
| 2,422,353 | A | * | 6/1947 | Hitt ............................ 242/157 R |
| 2,483,760 | A | * | 10/1949 | Duncan ......................... 254/395 |
| 2,783,025 | A | * | 2/1957 | Scheidt .......................... 254/396 |
| 2,816,734 | A | * | 12/1957 | Crofoot ...................... 242/615.2 |
| 3,070,355 | A | * | 12/1962 | Wyatt ..................... 254/134.3 R |
| 3,407,011 | A | * | 10/1968 | Zeidler ............................ 384/54 |
| 3,545,724 | A | * | 12/1970 | Wright ................. 254/134.3 PA |
| 4,246,675 | A | * | 1/1981 | Costanzo ........................ 15/315 |
| 4,327,897 | A | * | 5/1982 | Smith ............................. 254/395 |
| 4,479,453 | A | * | 10/1984 | Bonassi ......................... 114/218 |

(Continued)

FOREIGN PATENT DOCUMENTS

| FR | 2664441 | 1/1992 |
| WO | 03058055 | 7/2003 |
| WO | 2010024741 | 3/2010 |

OTHER PUBLICATIONS

English Abstract of FR2664441.

*Primary Examiner* — Pedro J Cuevas
(74) *Attorney, Agent, or Firm* — Dykema Gossett PLLC

(57) ABSTRACT

The invention relates to a wave power unit having a submerged station anchored on the sea bottom, a floating body floating on the sea surface and flexible connection means (3) connecting these. The submerged station has a linear generator with a reciprocating translator. According to the invention, the station includes a guiding device (9) for the flexible connection means (3). The guiding device (9) has a plurality of rotatable rollers (15a-18c). The rollers (15a-18c) form a passage for the flexible connection means (3). The invention also relates to use of the wave power unit and to a method for producing electric power.

28 Claims, 7 Drawing Sheets

(56) References Cited

U.S. PATENT DOCUMENTS

| | | | |
|---|---|---|---|
| 5,149,059 A * | 9/1992 | Monahan | 254/394 |
| 5,573,226 A | 11/1996 | Smith | 254/395 |
| 6,729,606 B1 * | 5/2004 | Durin | 254/395 |
| 7,405,489 B2 * | 7/2008 | Leijon et al. | 290/42 |
| 8,052,098 B1 * | 11/2011 | Kowaleski | 248/49 |
| 8,154,144 B2 * | 4/2012 | Muller et al. | 290/53 |
| 8,342,483 B1 * | 1/2013 | Manning | 254/134.3 R |
| 8,471,398 B2 * | 6/2013 | Leijon et al. | 290/53 |
| 8,564,144 B1 * | 10/2013 | Rome et al. | 290/1 C |
| 8,581,431 B2 * | 11/2013 | Grassi | 290/53 |
| 2010/0164227 A1 * | 7/2010 | Grassi | 290/52 |
| 2010/0327595 A1 * | 12/2010 | Gottler | 290/53 |
| 2011/0175360 A1 * | 7/2011 | Leijon et al. | 290/53 |
| 2011/0193347 A1 * | 8/2011 | Leijon et al. | 290/53 |
| 2013/0031897 A1 * | 2/2013 | Hagemann et al. | 60/505 |
| 2013/0127167 A1 * | 5/2013 | Dore et al. | 290/53 |
| 2013/0127168 A1 * | 5/2013 | Dragic | 290/53 |
| 2013/0199171 A1 * | 8/2013 | Brink | 60/507 |
| 2013/0229013 A1 * | 9/2013 | Scharmann et al. | 290/53 |

* cited by examiner

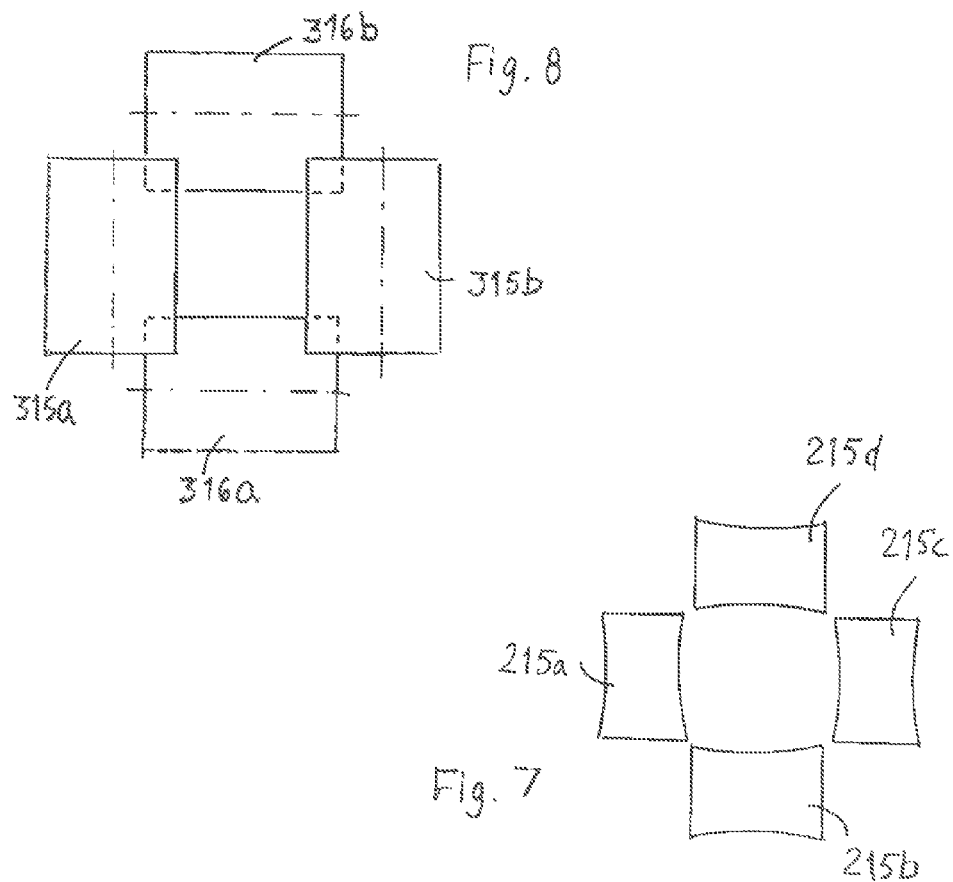
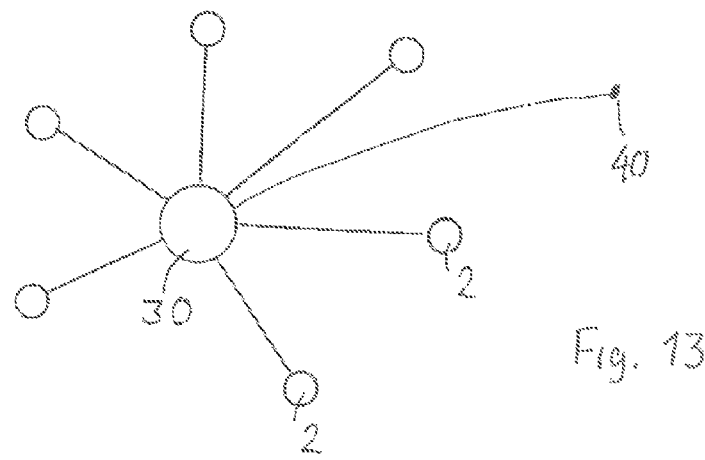

WAVE POWER UNIT WITH GUIDING DEVICE

FIELD OF INVENTION

The present invention in a first aspect relates to a wave power unit including a submerged station, at least one floating body and flexible connection means, the submerged station including a linear generator with a reciprocating translator and being arranged to be anchored to a sea bottom, the at least one floating body being arranged to float on the sea surface, the flexible connection means connecting the at least one floating body to the translator, the direction of the movement of the translator defining a centre axis. The connection means is flexible in the sense that it can be bent. It does not necessarily mean that it is elastic in its longitudinal direction. The connection means thus can be a wire, rope, chain, cable or the like. The invention also relates to a wave power plant including a plurality of such wave power units and to an electric network connected to such a wave power unit In a second aspect the invention relates to a use of such a wave-power unit.

In a third aspect the invention relates to a method of producing electric power by providing a floating body to float on the sea, providing an electric linear generator having a stator and a reciprocating translator, anchoring the stator in the bed of the sea and connecting the translator to the floating body by flexible connection means.

In the present application the terms "radial", "axial", "lateral" and the like refer to the direction of the axis defined by the reciprocating movement of centre of the translator, i.e. the centre axis if not explicitly otherwise is stated. The terms "upper" and "lower" refer to the vertical direction and relates to the locations of the components in question when the wave-power unit is in operation.

BACKGROUND OF INVENTION

Wave movements in the sea and in large inland lakes constitute a potential source of energy that has scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 03/058055 discloses such a wave-power unit where the moving part of the generator, i.e. the part that corresponds to the rotor in a rotating generator and in the present application called translator, reciprocates in relation to the stator of the generator. In that disclosure the stator is anchored in the sea bed. The translator is by a wire, cable or a chain connected to a body floating on the sea.

Ideally the floating body is located vertically above the generator on the axis of the translator as illustrated in FIG. 1 of that disclosure. However, the floating body is exposed also to lateral forces from the waves and from the wind. Therefore the floating body can drift away from that ideal position and will normally be located at a distance there from. As a consequence the wire connecting the translator and the floating body will not be aligned with the axis of the translator. This might cause side forces to the translator resulting in that it will not be centred or/and it becomes inclined, which will disturb the operation of the generator.

This can to a large extent be avoided by journaling the translator in the stator. However, when the wire is inclined the side forces in that case will result in a high load on the journals and disturb the operation.

In order to reduce this problem it is known to provide guiding means that guides the wire towards an axial direction when connected to the translator. Such a device is disclosed in PCT/SE2008/050964. The disclosed device, however, might cause wear on the wire.

The object of the present invention is to solve the above mentioned problem and thus provide a wave-power unit where the generator will operate properly irrespective of the relative lateral position of the floating body, and simultaneously avoid the drawbacks related to known technique.

SUMMARY OF INVENTION

The above mentioned object is achieved according to the first aspect of the invention in that a wave power unit of the kind introductionally specified includes the specific features that the station further includes a guiding device for the flexible connection means, which guiding device includes a plurality of rollers, each roller being rotatable around a respective axis, which rollers are arranged to form a passage for the flexible connection means, which passage has an upper end and a lower end.

By this guiding device a proper position of the translator within the generator will be secured unrespectable of the relative lateral position of the floating body. If the translator movement is guided in the stator by journaling the same there will be no or small side forces affecting the journaling. The dimensioning of the journaling thereby can be made much smaller than else and be adapted to what is required solely to guide the reciprocating movement of the translator. When the connection means such as a wire pass through the guiding device it will be bent when the floating body is not located on the same vertical as the translator. This causes friction between the wire and the guiding device. The friction represents a loss of energy reducing the efficiency of the wave power unit. More severe is the wear thereby occurring on the wire. By the arrangement of a plurality of rollers that form a passage for the connection means, the wire will be able to roll on the rollers in stead of scavenging against a stationary surface. Thereby the efficiency is increased and, more important, the wear on the wire will be substantially reduced.

According to a preferred embodiment of the invented wave power unit, the guiding device further includes stationary guiding means located above the upper end of the passage.

With such a construction the rollers will perform the guiding function when the lateral offset position of the floating body in relation to the centre axis is within a relatively small range. When the offset position is larger, the stationary guiding device will also perform guiding. Most of the time the offset position is small such that the stationary guiding means will be activated only a small fraction of the operation time. The problem with wear discussed above can be accepted for such short time periods, and thanks to the rollers the pressure between the connection means and the stationary guiding means is reduced, whereby the wear will be less severe. Since guiding at large lateral deviations of the floating body is taken care of by the stationary guiding means, the number of rollers can be kept relatively low. This makes the guiding device less complex and thereby less expensive to manufacture and there will be less risk for failure.

According to a further preferred embodiment, the stationary guiding means has the shape of a ring coaxial with the centre axis.

This is a very simple but sufficient alternative for the stationary guiding means such that manufacturing and maintenance costs will be low. The ring has preferably a curved inner surface in order to minimize the wear. It is preferably torus shaped. More than one ring can form the stationary guiding means. In such case the rings are axially distributed and coaxially with each other. The rings have different diameters with decreasing diameter from the uppermost one to the lowermost one.

According to a further preferred embodiment, the stationary guiding means has the shape of a funnel coaxial with the centre axis, the narrow end of the funnel facing the upper end of the passage.

Thereby the contact surface between the flexible connection means and the stationary support means will be relatively large and the surface pressure consequently relatively small, which further reduces the wear.

According to a further preferred embodiment, the number of rollers is four, arranged in two sets with two rollers in each set, one of the sets being located above the other, the rollers in each set having their axes in a common plane perpendicular to the centre axis, and the axes of the four rollers together form a quadrangle in a projection in a plane perpendicular to the centre axis.

With such a few rollers combined with the stationary guiding means the guiding device will be very simple.

According to a further preferred embodiment, the quadrangle is a square.

Thereby the guiding device will be as symmetric as possible with a predictable and uniform guiding function in all directions.

According to a further preferred embodiment, the number of rollers is three, the axes of the rollers being located in a common pine perpendicular to the centre axis and forming a triangle.

This is an alternative to the four-rollers embodiment mentioned above and which also combines a simple construction with a reliable guiding function.

According to a further preferred embodiment, the axis of at least some of the rollers is perpendicular to the centre axis.

Thereby any relative movement between the rollers and the connection means will be reduced as much as possible, i.e. sliding of the connection means on the rollers is minimized.

According to a further preferred embodiment, each roller has an inside facing the passage, and the insides of the rollers together form at least one closed contour as seen in a projection in a plane parallel to the centre axis.

By the closed contour it is assured that the connection means in all directions lateral thereto will abut against one of the rollers. There will thus not be sliding in any direction.

According to a further preferred embodiment, at least one group of rollers have their axes located in the same plane and extend in different directions in said plane, each such group defining a set of rollers.

The connection means thereby will path through at least one plane where there a rollers on different sides of the connection means, whereby the rolling relation between the connection means and the guiding device in each of these planes will occur in various directions. Thereby the risk for sliding with wear is further reduced.

According to a further preferred embodiment, the guiding device includes a plurality of sets of rollers where the rollers in each set have their axes located in a respective plane.

With a plurality of such sets of rollers the guiding action with rolling contact extend along a certain axial length, which provides a possibility to have a gradual change of direction of the connection means without any sliding of the connection means on the guiding device. Preferably the number of sets is in the range of 1-10 sets, most preferably 4-6 sets.

According to a further preferred embodiment, each of the planes of the set of rollers is perpendicular to the centre axis.

This arrangement further reduces the risk of sliding contact between the connection means and the guiding device.

According to a further preferred embodiment, each set of rollers includes 2-4 rollers.

These configurations are advantageous options to combine simplicity with a small risk of sliding. Few rollers in each set make the construction simple. With two rollers, a pair of adjacent sets will be able to provide rolling contact in all lateral directions. With three or four rollers in one set this is attained within only one set.

According to a further preferred embodiment, the rollers in one set have equal size.

This results in symmetry with respect to the centre axis which assures a uniform behaviour independent of in which direction the floating body is aside of the centre axis.

According to a further preferred embodiment, the guiding device includes at least one pair of axially adjacent sets of rollers, where the rollers in one of the sets in the pair have equal size as the rollers in the other sat of the pair.

When rolling contact in all lateral direction is formed by two axially adjacent sets of rollers, the equal size contribute to obtain symmetry and to provide equal rolling conditions in any lateral direction.

According to a further preferred embodiment, each set of rollers includes at least three rollers with their axis forming a polygon.

This configuration combines a simple construction with the ability of each set to assure rolling contact in all lateral directions. Preferably all the polygons are of the same kind, although it is not excluded that they can be different, e.g. that some are triangles and some are quadrangles.

According to a further preferred embodiment, the polygon is regular.

This further contributes to the symmetry of the guiding device such that the performance will be as equal as possible in all lateral directions.

According to a further embodiment of the invention, all polygons have its respective geometrical centre axially aligned with each other and that the polygon of two adjacent set of rollers are turned relative to each other in their respective plane an angle $\alpha$ that is $180/n°$, where n is the number of sides in the polygon.

The alignment in the axial direction results in a smooth continuous bending of the connection means from its inclined direction to the axial direction. By the turned relationship the specified angle, the corners of one polygon will be located in the area of the middle of the side of the adjacent polygon, which further contributes to reduce the wear on the connection means and reduces the risk that it will be squeezed at the corners of the polygons.

According to a further preferred embodiment, the polygon is a triangle or a quadrangle.

The polygon is thereby formed by as few rollers as possible which contributes to a simple construction. This reduces the risk for failure and simplifies the manufacture.

According to a further preferred embodiment, the guiding device includes a plurality of sets of rollers, where the size of the polygon formed by the axes of the rollers in any set is at least as large as the size of the corresponding polygon of each set that is located below that set.

The device thereby alternatively is decreasing in size from the upper end or is of uniform size, or has apportion that is uniform in size and another portion with decreasing size. Preferably the device is generally decreasing in size and optionally is of uniform size along a portion of its axial extension. Decreasing size in the downward direction provides advantageous conditions when gradually bending the connection means to the axial direction when it leaves the lower end of the guiding device.

According to a further preferred embodiment, at least two adjacent set of rollers have different size of the polygon formed by the axes of the rollers.

This embodiment represents the preferable arrangement with decreasing size for gradual change of direction. It is of course to be understood that there can be three or more consecutive sets of rollers with each set having smaller size than the nearest above located set.

According to a further preferred embodiment, the guiding device includes two lowermost sets of rollers, which have equal size of the polygon formed by the axes of the rollers in the respective set.

Two sets of rollers with equal size of the rollers is advantageous to arrange at the lower end of the guiding device in order to stabilize the axial direction of the connection means from the guiding device towards the translator.

According to a further preferred embodiment, the insides of each roller in each set form a polygonal opening, the linear dimension of the uppermost polygonal opening is 2-5 times as large as the linear dimension of the lowermost polygonal opening.

Within this range the guiding device is optimized for a smooth extension of the bend with regards to the amount of lateral deviation of the floating body from the centre axis that will be foreseen in most applications and in most operating conditions. In most cases the relation will be in the range of 2.5-3.5 times.

According to a further preferred embodiment, each roller has two end edges, which end edges at the inside of adjacent rollers in a set are located at a distance from each other, which distance is smaller than the width of the connection means.

Thereby the connection means cannot enter into the clearance that necessarily is formed between these edges, which would entail the risk for sliding contact and that the connection means will be squeezed in this clearance. The width in this context means the dimension of the connection means in the lateral direction.

According to a further preferred embodiment, at least some rollers are cylindrical.

In principle the rollers could have a concave or convex profile. However, a straight profile as in a cylindrical roller reduces the risk for sliding in the tangential direction, i.e. along the axial direction of the roller. A cylindrical roller is normally less expensive to manufacture than other shapes. The cross section of the rollers are preferably circular. Preferably all rollers have this shape.

According to a further preferred embodiment, at least some rollers have a concave profile in a plane through the axis of the roller.

A concave profile reduces the risk that the connection means will slide towards the end of the roller, where it might be squeezed in the clearance between the two adjacent rollers.

According to a further preferred embodiment, when there are a plurality of sets with the rollers in each set having equal radius with their axes in a common plane, the distance between two adjacent planes is in the range of 1-1.5 times the sum of the radii of one roller in each of the sets This range represents an optimized balance between on one hand the desire to have the set of rollers relatively closed to each other in order to provide an efficient guidance of the connection means, and on the other hand to have an arrangement that is constructional simple. If the set of rollers would be more closed to each other than defined by the prescribed range, it would result in an unfavourable sharp bending of the connection means from one set to the next.

According to a further preferred embodiment, the guiding device includes a frame in which all rollers are mounted.

The rollers thereby are distinctly arranged in relation to each other and can easily be adapted to the desired relative positions of them. It is to be understood that the frame on which the rollers are mounted, at its upper end can be connected to an auxiliary guiding means, e.g. a conically shaped tube, having its smaller end attached to the upper end of the roller frame.

According to a further preferred embodiment, the frame has the general shape of a funnel.

The shape thereby will be advantageously adapted for arranging set of rollers of decreasing size towards the lower end of the openings formed by each set, and also to arrange the lowermost pair of sets to have openings of equal size. With general shape of a funnel is meant not only a shape where the cross section perpendicular to the central axis is circular, but also a polygonal shape. The shape thus can be either as a cone or as a pyramid. The frame might have a straight portion at is lower end.

According to a further preferred embodiment, the frame is rigidly connected to a housing of the generator.

This simplifies to assure that each roller will be properly positioned relative to the centre axis.

According to a further preferred embodiment, at least a portion of the flexible connection means includes a core and a surface layer surrounding the core.

This allows an optimization of the material properties for their different functions. It is important that the core has good strength properties to transmit the forces, and it is important that the surface layer has good wear resistance, low friction and being suitable to roll on the rollers. The flexible connection means thereby will be particularly adapted to cooperate with the guiding device The surface layer also protects the core against corrosion. The surface layer can be of a material with tribologic properties. In principle the complete flexible connection means could be of this kind, but it is most important for the portion that passes through the guiding device. Thus preferably only this portion is of this specified kind.

According to a further preferred embodiment, the core is a wire and the surface layer is a woven or braided net structure.

Thereby the respective component in an advantageous way meets the demands mentioned next above. The wire can be of metal or polymer.

According to a further preferred embodiment, the surface layer is a woven or braided net structure.

It will thereby be suitable for rolling as well as sliding guiding movements.

According to a further preferred embodiment, the flexible connection means further includes an intermediate layer between the core and the surface layer.

The intermediate layer protects the outer layer from being scraped by the core.

According to a further preferred embodiment, the intermediate layer is attached to the core, and the surface layer is loosely fitted to the intermediate layer.

Thereby small relative axial movements between the core and the surface layer can occur, which reduces the risk for that the surface layer will be destroyed due to the friction forces from the guiding device.

According to a further preferred embodiment the guiding device used together with the preferred embodiments of the flexible connection means consists solely of stationary guiding means. Thus no rollers are present in this embodiment.

Although the specific kinds of flexible connection means mentioned above are particularly advantageous in cooperation with a guiding device including rollers, they are also well suited to be applied also in cooperation with a guiding device without such rollers.

The invention also relates to a wave power plant that includes a plurality of wave power units according to the present invention, in particular to any of the preferred embodiments thereof.

The invention also relates to an electrical network that includes a connection to a wave power unit according to the present invention, in particular to any of the preferred embodiments thereof.

In the second aspect of the invention the invented wave power unit is used for producing electric power and supplying the power to an electrical network.

In the third aspect of the invention the object is met in that the method of the kind introductionally specified includes the specific measures of arranging the connection means to pass through a guiding device of the station, mounting a plurality of rollers on the guiding device such that each roller is able to rotate around a respective axis and such that the rollers form a passage for the connection device.

According to preferred embodiments of the invented method, the method is carried out with a wave power unit according to the present invention, in particular to any of the preferred embodiments thereof.

The invented wave power plant, the invented electric network, the invented use and the invented method all have advantages corresponding to those of the invented wave power unit and the preferred embodiments thereof and which have been described above.

The above described preferred embodiments of the invention are specified in the dependent claims. It is to be understood that further preferred embodiments of course can be constituted by any possible combination of preferred embodiments above and by any possible combination of these and features mentioned in the description of examples below.

The invention will be further explained through the following detailed description of examples thereof and with reference to the accompanying drawings.

SHORT DESCRIPTION OF THE DRAWINGS

Figure 5:
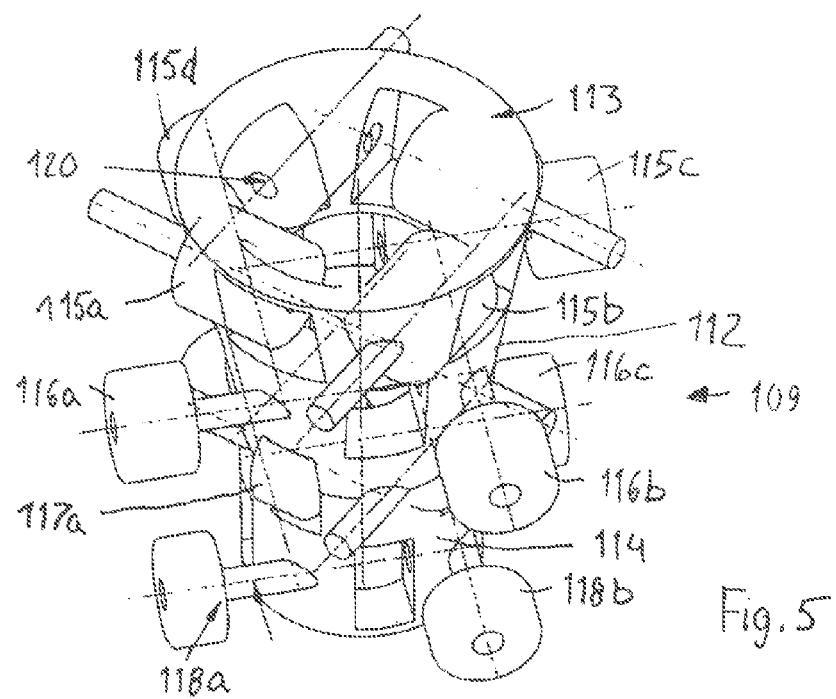
FIG. 5 is an enlarged perspective view of an alternative example of the same detail in FIG. 1.
Figure 6:
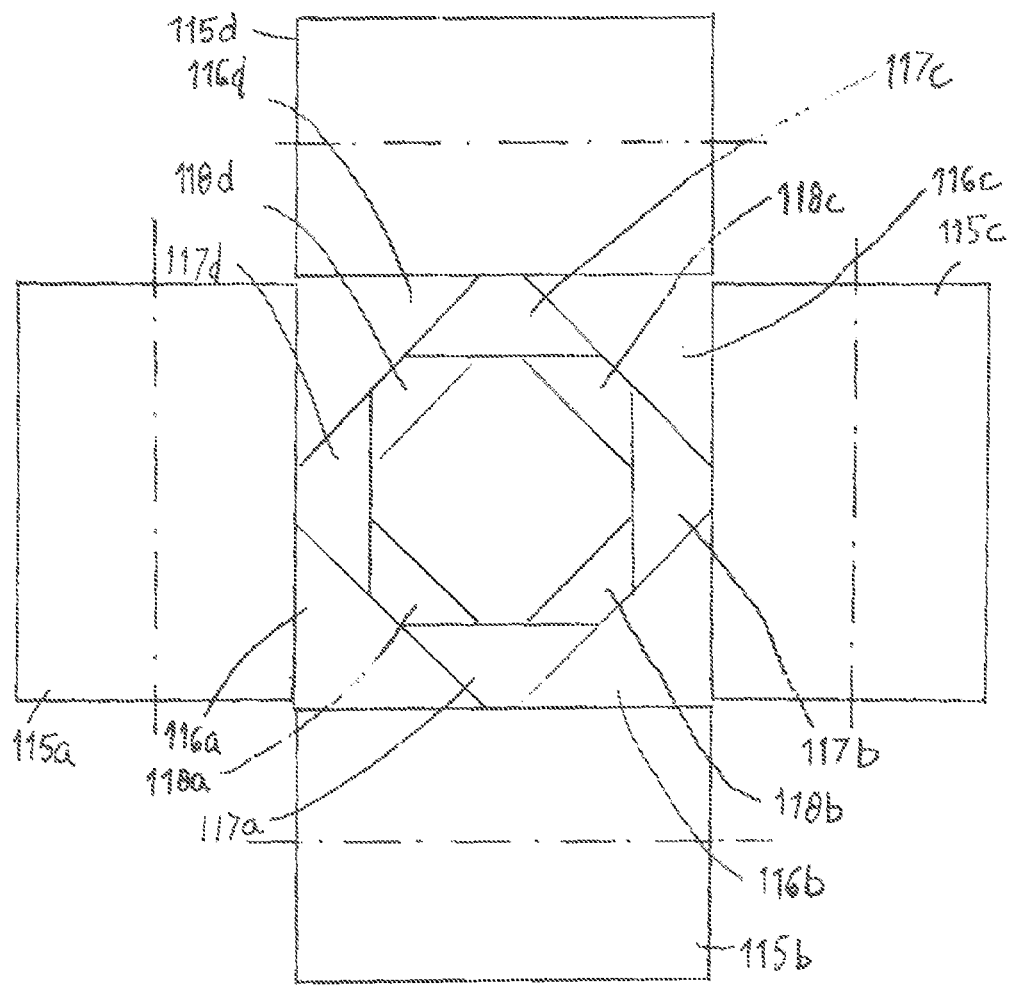

FIG. 6 in an end view schematically illustrates components of the detail in FIG. 5.

Figure 1:
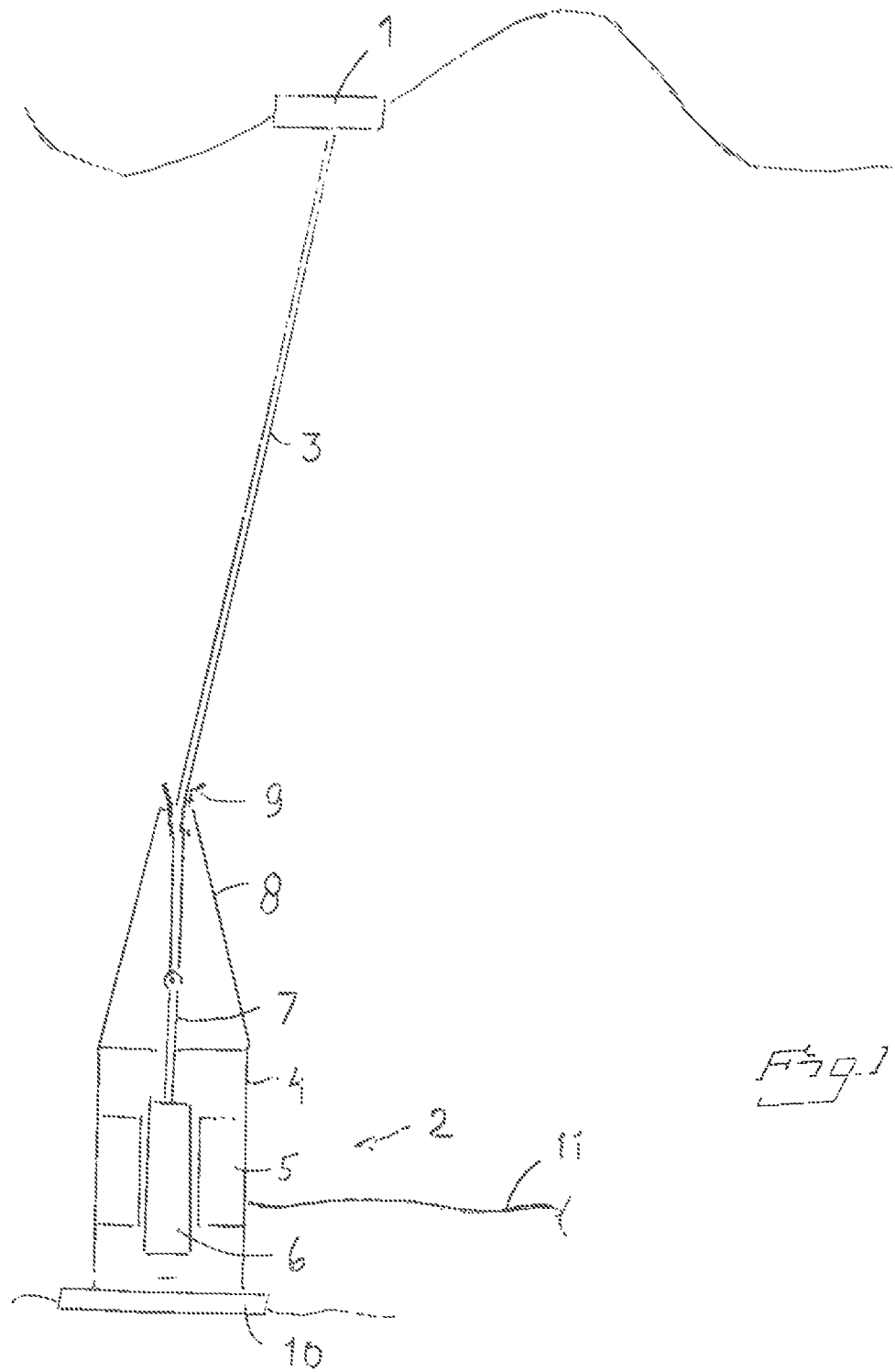
FIG. 1 is a schematic section through a wave power unit according to the invention.

FIGS. 7 and 8 illustrate further alternative examples of components for the same detail of FIG. 1.

Figure 9:
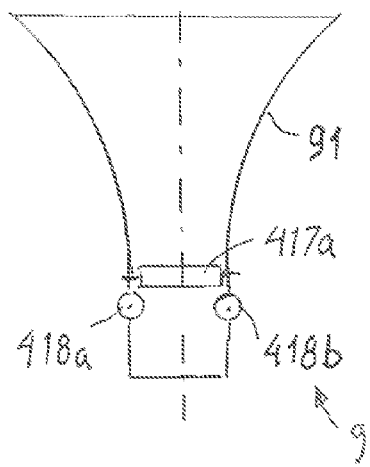
Figure 10:
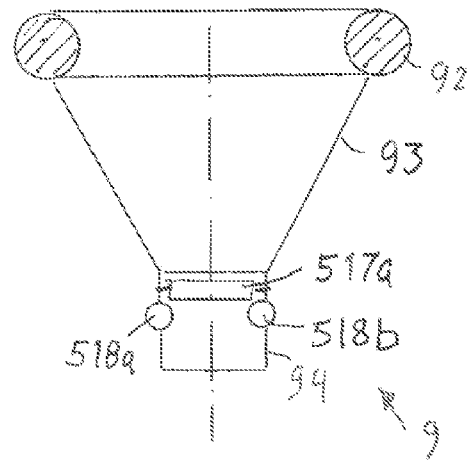

FIGS. 9 and 10 illustrate still further alternative examples of a component in FIG. 1.

Figure 11:
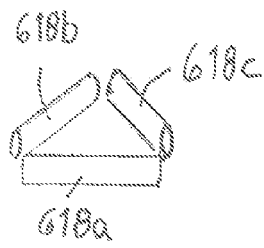

FIG. 11 illustrates a modification of FIG. 9.

Figure 12:
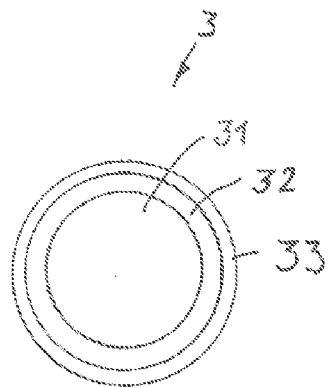

FIG. 12 is a section along line XII-XII in FIG. 1.

FIG. 13 schematically illustrates a wave power plant according to the invention.

DESCRIPTION OF EXAMPLES

FIG. 1 is a schematically side view of a wave-power unit according to the invention at operation in the sea. A floating body 1 floats on the sea surface and is connected by a connection means 3 such as a cable, wire, rope, chain or the like, to a linear generator 2 anchored at the sea bed. In the figure the generator is attached at the sea bed. It is, however, to be understood that the generator can be located above the sea bed and be anchored in some other way.

The linear generator 2 has a stator 5 with windings and a translator 6 with magnets. The translator 6 is able to reciprocate up and down within the stator 5 thereby generating current in the stator windings, which current by an electric cable 11 is transferred to an electric network.

The translator 6 includes a rod 7 to which the wire 3 is attached. When the floating body 1 due to the wave movements of the sea surface is forced to move up, the floating body will pull the translator 6 upwards. When the floating body thereafter moves down the translator 6 will move down through gravity. Optionally but preferably a spring (not shown) or the like acting on the translator 6 provides an additional force downwards.

Since the generator 2 is anchored in the sea bed and the floating body 1 floats freely on the water surface, the floating body is free to move laterally in relation to the generator 2. Thereby the connection means 3 will become inclined.

At the entrance of the connection means 3 into the housing 4 of the generator 2 there is provided a guiding device 9 that guides the connection means to move vertically below the guiding device 9 while allowing the connection means 3 that is above the guiding device to move in an inclined position. The guiding device 9 is attached to a conical construction 8 above the housing 4 of the generator and attached thereto.

The guiding device 9 allows the connection means 3 to gradually change its direction when passing through guiding device 9, such that the wear of the connection means becomes limited.

Figure 2:
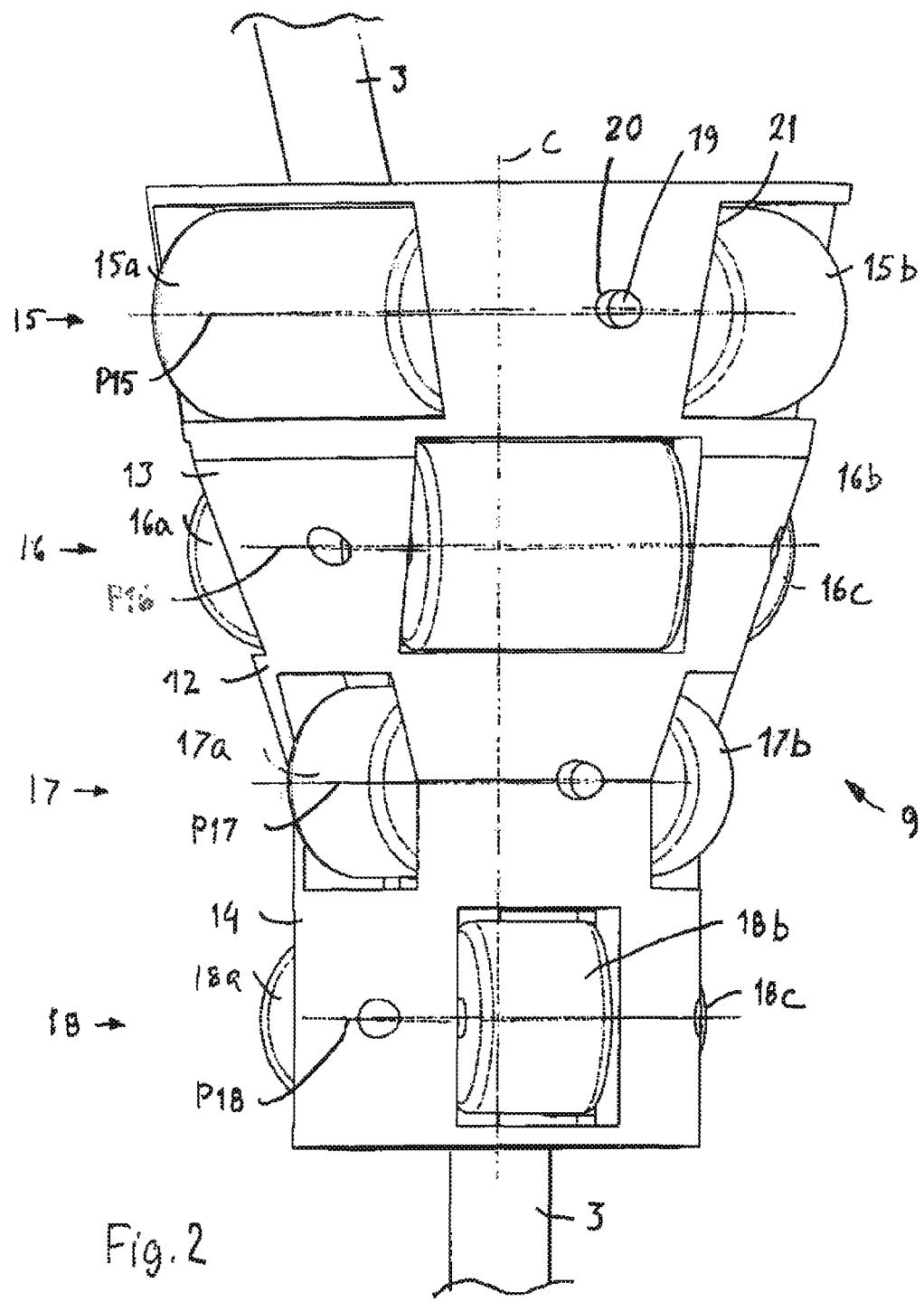
FIG. 2 is an enlarged side view of a detail off the wave power unit of FIG. 1

FIG. 2 depicts a side view of the guiding device 9 in FIG. 1. The guiding device consists of a generally funnel shaped frame 12. It has an upper conical part 13 and a lower cylindrical part 14. A number of rollers 15a-18d (of which not all are visible in the figure) are rotatably mounted in the frame 12. The rollers are mounted in a plurality of axially, i.e. vertically distributed sets 15-18 of rollers. Each set 15-18 has three rollers.

The upper set 15 thus have three rollers 15a, 15b, 15c, (of which not roller 15c is visible). The axes of the rollers in set 15 are all in a common plane P15 that is perpendicular to the central axis C, defined by the direction of movement of the centre of the translator 6. Each of the axes of the rollers 15a-15c in set 15 thus is perpendicular to the centre axis C. The axes of these rollers 15a-15c form a regular triangle in the plane P15. Each of the rollers 15a-15c are circular-cylindrical, which means that also the insides of the rollers form a regular triangle. Each of the rollers 15a-15c is mounted in an aperture 21 in the wall of the frame 12. Each roller is mounted on a shaft 19 by means of a bearing (not shown), which can be a sliding bearing or a roller bearing. The shaft at each end extends into a small shaft aperture 20 in the wall of the frame.

The set 16 of rollers 16a-16c next below the uppermost set 15 is arranged in substantially the same way as the upper set 15. One difference, however, is that each roller 16a-16c in the set 16 is smaller in size than the rollers 15a-15c in the upper set. They thus have shorter length. The diameter can be the same or smaller. The insides of the rollers 16a-16c will thus also form a triangle similar to that formed by the insides of the rollers 15a-15c of the upper set 15. But since the length of the rollers is smaller the triangle is smaller.

Another difference is that the rollers 16a-16c of this set 16 are mounted offset 60° in the circumferential direction with respect to the rollers 15a-15c of the upper set. The triangle formed by insides of the rollers 16a-16c of this set thereby is turned 60° with respect to the corresponding triangle of set 15.

Also the rollers 17a-17b of the next below set 17 and the rollers 18a-18c of the lowermost set 18 are correspondingly arranged. The rollers in set 17 are shorter than those in set 16 The rollers in sets 17 and 18 have the same length and the triangle formed by each of these sets have the same size. The triangle formed by the insides of the rollers in set 17 is tuned 60° in the circumferential direction in relation to the triangle of set 16. The triangle in set 18 is turned further 60°. This means that the triangles formed by sets 15 and 17 have the same orientation in its respective plane, and that the triangles formed by sets 16 and 18 have the corresponding relation.

The connection means 3, e.g. a wire enter from above through the upper set 15 and leaves the guiding device through the lower set 18. The wire 3 thereby is bent from its inclined direction above the guiding device 9 to a substantially axial direction towards the translator 6. This bending is forced by the rollers within the gradually decreasing triangular space formed between the rollers The wire 3 moves up and down through the guiding device, thereby rolling on the rollers.

The material of the frame 12 can be steel or a polymer, e.g. polyamide. Also the rollers and their shafts can be made of a material such as steel or polyamide. When the rollers are made of steel they can have a coating of polyamide on their surfaces.

Figure 3:
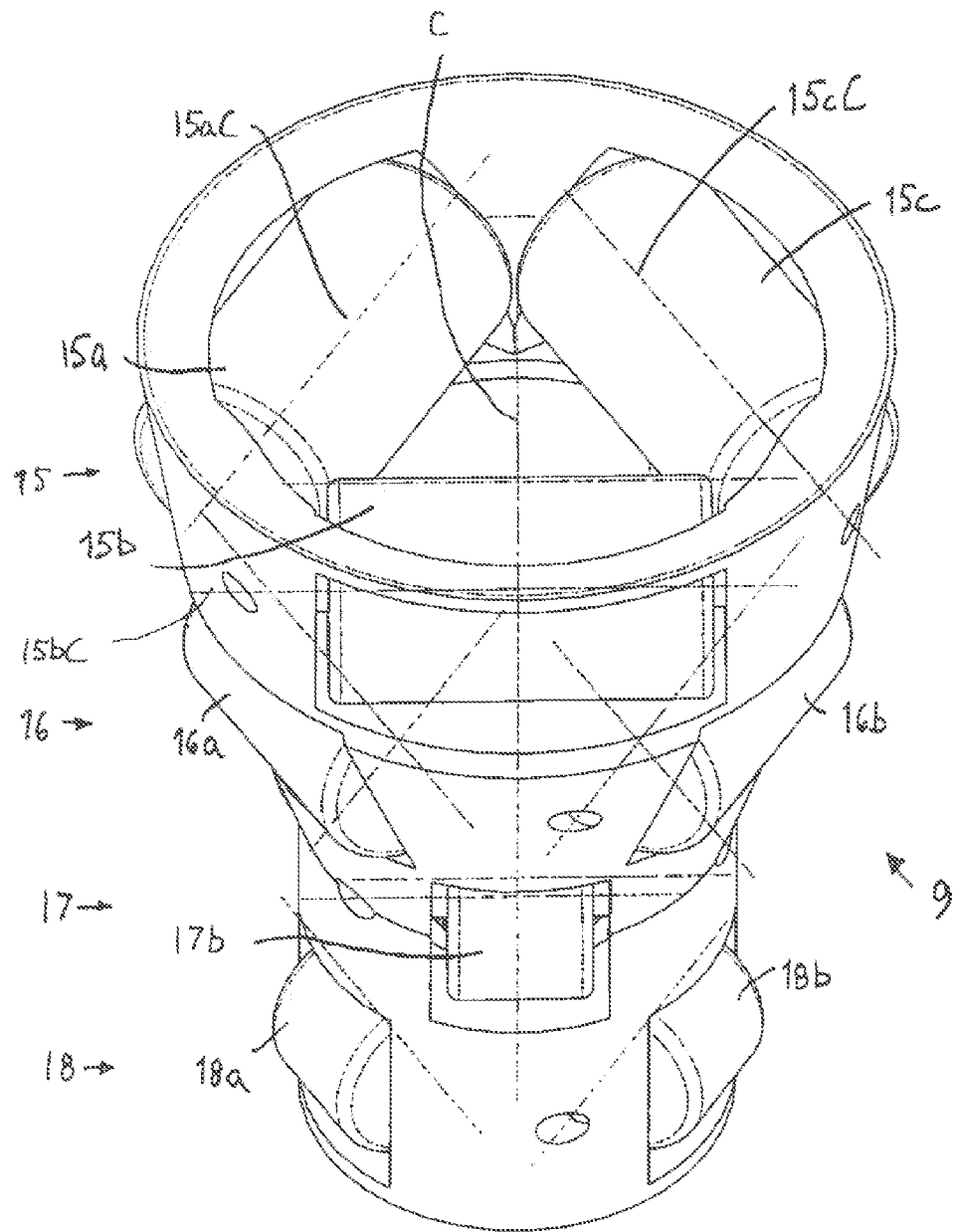
FIG. 3 is a perspective view of the detail of FIG. 2.

In FIG. 3, which is a perspective view of the guiding device of FIG. 2, the triangular formed by the axes 15aC, 15bC, 15cC can be seen, and the corresponding triangle formed by the insides of these rollers 15a, 15b, 15c is visible.

Figure 4:
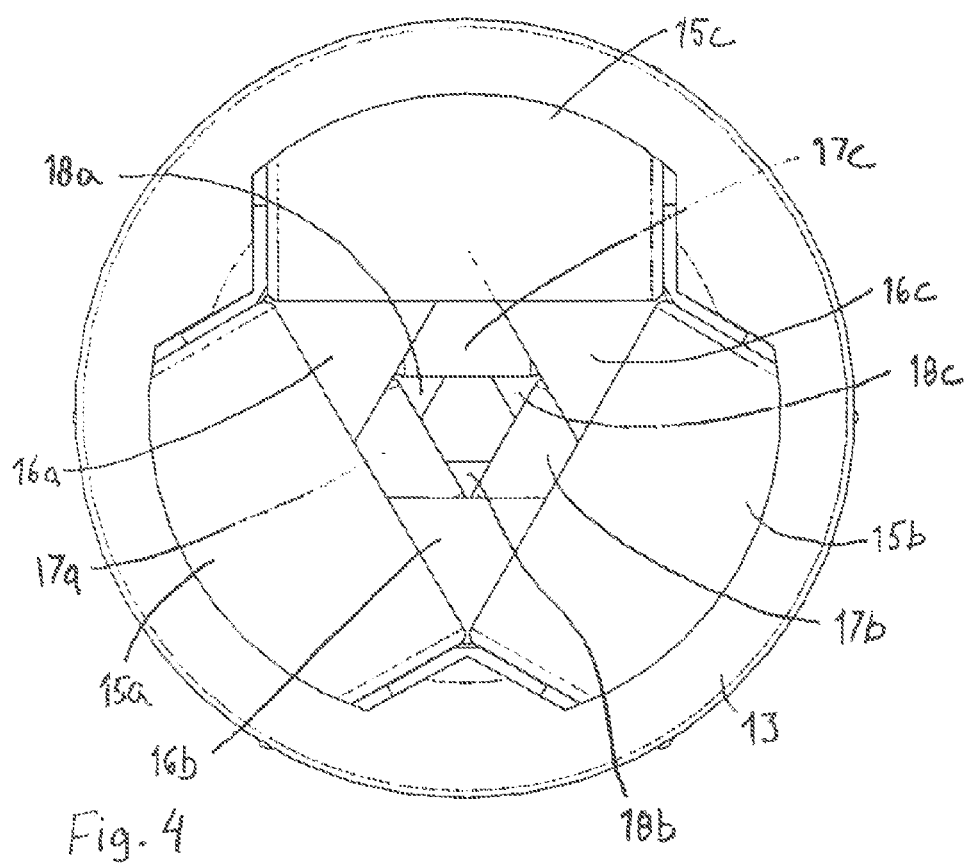
FIG. 4 is an end view of the detail of FIG. 2.

The gradually decreasing size of the triangular formed by the sets of rollers can be seen in FIG. 4, which is an end view from above of the guiding device of FIG. 2.

FIG. 5 in a perspective view illustrates an alternative example of the guiding device 109, in which there are four rollers in each set. As in the above described example the rollers are mounted in apertures in the frame 112. The figure is partly exploded with some of the rollers and their shafts illustrated outside its respective aperture The four rollers 115a, 115b, 115c, 115d of the upper set 115 have their axes in a common plane perpendicular to the centre axis and form together a square. Consequently the insides of these rollers also form a square. The sets 116, 117, 118 that lie below also have four rollers each. The length of the rollers is shorter the lower the set is located, and the size of the square formed by the insides of the rollers is correspondingly decreasing. Each set is turned 45° in the circumferential direction with respect to the set nearest above.

FIG. 6 is a simplified end view from above of the guiding device 109 of FIG. 5. In this view the above described geometry is more clearly visible. By the four rollers 115a, 115b, 115c, 115d of the upper set 115 a relatively large square is formed between them. The rollers 116a, 116b, 116c, 116d of the next set form a somewhat smaller square with a 45° turned orientation relatively to the upper square. The rollers 117a, 117b, 117c, 117d of the next set 117 and the rollers 118a, 118b, 118c, 118d of the lowermost set 118 form corresponding squares of decreasing size and with a corresponding change regarding their orientation.

FIG. 7 illustrates an example with four rollers 215a-215d in one set, where the other sets are left out from the figure. The rollers have a concave profile. The other sets also have a corresponding concave profile. It is however possible to alternatively have some sets with concave roller profiles and some sets with straight profiles.

FIG. 8 illustrates an example with two rollers in each set. The figure shows an upper set with two rollers 315a, 315b and an adjacent lower set with two rollers 315a, 315b. The rollers of the two sets in this example have equal size, but can as in the examples earlier described have decreasing length towards lower positioned sets.

FIG. 9 illustrates an alternative example of the guiding device in FIG. 1. In this example there are only two sets of rollers, an upper set of two rollers 417a (only one being visible) and a lower set of two rollers 418a, 418b. Above the two set of rollers is a funnel shaped stationary part 91 of the guiding device 9. The rollers are journalled in a lower frame part of the guiding device.

FIG. 10 shows a further alternative example of the guiding device 9. Also in this example there are two pairs of rollers like in the example of FIG. 9. The rollers 517a, 518a, 518b are journalled in a cylindrical frame part 94. By rods 93 the frame part 94 is connected to a ring shaped element 92 located at a distance above the rollers. The ring shaped element forms a rigid part of the guiding device.

As an alternative to two pairs of rollers as in FIG. 9, these can be replaced by one set of three rollers 618a, 618b, 618c as in FIG. 11. These are arranged in a triangle in one single plane. This alternative of course also can be applied to the example of FIG. 10.

FIG. 12 shows a cross section of the flexible connection means 3 according to an advantageous alternative thereof. The flexible connection means has an inner core 31, e.g. a steel wire. On the outside there is an outer surface layer 33 for protective purpose and being adapted to resist wear when sliding against the guiding device 9. The outer layer is preferably a woven or braided component. For protecting the outer layer 33 from being scraped by the core 31 there is an intermediate layer 32. The intermediate layer 32 is attached to the core 31 and in loose relationship to the outer layer 33. Suitable material for the intermediate layer is a polymer such as a polyester.

FIG. 13 in a view from above schematically illustrates a wave power plant having a plurality of wave power units of the kind described above. The generators 2 of these units are all connected to a submerged switchgear 30 connected to an electric network 40.

The invention claimed is:

1. A wave power unit including a submerged station, at least one floating body (1) and flexible connection means (3) wherein the submerged station includes a linear generator (2) with a reciprocating translator (6) and being arranged to be anchored to a sea bottom, the at least one floating body (1) being arranged to float on the sea surface, the flexible connection means (3) connecting the at least one floating body (1) to the translator (6), the direction of movement of the translator (6) defining a center axis (C) and whereby the station further includes a guiding device (9) for the flexible connection means (3), which guiding device (9) includes a plurality of rollers (15a-18c), each roller (15a-18c) being rotatable around a respective axis, which rollers (15a-18c) are arranged to form a passage for the flexible connection means (3), which passage has an upper end and a lower end, whereby a group of at least three rollers forms a set, said set includes at least three rollers that have their axes in the same plane forming a polygon, or said set includes two pairs of rollers, the rollers in each pair having their axes in a common plane perpendicular to the center axis and one pair being located above the other, the axes of the four rollers forming a polygon that is a quadrangle in a projection perpendicular to the center axis, and whereby the guiding device includes a plurality of sets of which at least two adjacent sets of rollers have different size of the polygon.

2. The wave power unit according to claim 1, wherein the guiding device (9) further includes stationary guiding means (91, 92) located above the upper end of said passage.

3. The wave power unit according to claim 2, wherein the stationary guiding means (92) has the shape of a ring (92) coaxial with the center axis (C).

4. The wave power unit according to claim 2, wherein the stationary guiding means (91) ha the shape of a funnel (91) coaxial with the center axis (C), the narrow end of the funnel (91) facing the upper end of said passage.

5. The wave power unit according to claim 1, wherein each roller (15a-18c) has an inside facing the passage and in that the insides of the rollers (15a-18c) together form at least one closed contour as seen in a projection in a plane perpendicular to the center axis (C).

6. The wave power unit according to claim 1, wherein the rollers in one set (15-18) have equal size.

7. The wave power unit according to claim 6, wherein the guiding device (9) includes at least one pair of axially adjacent sets (17, 18) of rollers, where the rollers in one (17) of the sets in the pair have equal size as the rollers in the other (18) set of the pair.

8. The wave power unit according to claim 1, wherein the polygon is regular.

9. The wave power unit according to claim 8, wherein all polygons have its respective geometrical center axially aligned with each other and that the polygon of two adjacent sets (15, 16) of rollers are turned relative to each other in their respective plane (P15, P16) an angle α that is 180/n°, where n is the number of sides in the polygon.

10. The wave power unit according to claim 1, wherein the size of said polygon of any set (15-17) is at least as large as the size of said polygon of each set (16-18) that is located below said any set.

11. The wave power unit according to claim 1, wherein at least two adjacent sets (15, 16) of rollers have different size of said polygon.

12. The wave power unit according to claim 1, wherein the guiding device includes two lowermost sets (17, 18) of rollers, which have equal size of said polygons.

13. The wave power unit according to claim 1, wherein the insides of each roller (15a-18c) in each set (15-18) form a polygonal opening, the linear dimension of the uppermost polygonal opening is 2-5 times as large as the linear dimension of the lowermost polygonal opening.

14. The wave power unit according to claim 1, wherein each roller (15a-18c) has two end edges and in that the edges at the inside of adjacent rollers in a set (15-18) are located a distance from each other, which distance is smaller than the width of the connection means (3).

15. The wave power unit according to claim 1, wherein at least some rollers (15a, 18c) are cylindrical.

16. The wave power unit according to claim 1, wherein at least some rollers (215a-215d) have a concave profile in a plane through the axis of the roller.

17. The wave power unit according to claim 1, having a plurality of sets (15-18) of rollers, wherein each set (15-18) of rollers has rollers of equal radius, with the axes of the rollers in a common plane (P15-P18) and in that the distance between two adjacent planes (P15, P16) is in the range of 1-1.5 times the sum of the radii of one roller in each of said two sets.

18. The wave power unit according to claim 1, wherein the guiding device (9) includes a frame (12) in which all the rollers (15a-18c) are mounted.

19. The wave power unit according to claim 18, wherein the frame (13) has the general shape of a funnel.

20. The wave power unit according to claim 18, wherein the frame (13) is rigidly connected to a housing (4, 8) of the generator (2).

21. The wave power unit according to claim 1, wherein at least a portion of the flexible connection (3) means includes a core (31) and a surface layer (33) surrounding the core (31).

22. The wave power unit according to claim 21, wherein the core (31) is a wire and the surface layer (33) is a woven or braided net structure.

23. The wave power unit according to claim 22, wherein the flexible connection means (3) further includes an intermediate layer (32) between the core (31) and the surface layer (33).

24. The wave power unit according to claim 23, wherein the intermediate layer (32) is attached to the core (31), and the surface layer (33) is loosely fitted around the intermediate layer (32).

25. The wave power plant, wherein the wave power plant includes a plurality of wave power units according to claim 1.

26. An electrical network, wherein the network (40) includes a connection to a wave power unit according to claim 1.

27. The use of the wave power unit according to claim 1, for producing electric power and supplying the power to an electric network.

28. A method of producing electric power by providing a submerged station, which station includes a linear generator with a reciprocating translator and anchoring the station to a sea bottom, providing at least one floating body to float on the sea surface, connecting the at least one floating body to the translator by a flexible connection means characterized by arranging the connection means to pass through a guiding device of the station, mounting a plurality of rollers on the guiding device such that each roller is able to rotate around a respective axis and such that the rollers form a passage for the connection means, and such that a group of at least three rollers forms a set, said set includes at least three rollers that have their axes in the same plane forming a polygon, or said set includes two pairs of rollers, the rollers in each pair having their axes in a common plane perpendicular to the center axis and one pair being located above the other, the axes of the four rollers forming a polygon that is a quadrangle in a projection perpendicular to the center axis, and whereby the guiding device includes a plurality of sets of which at least two adjacent sets of rollers have different size of the polygon.

* * * * *

UNITED STATES PATENT AND TRADEMARK OFFICE
CERTIFICATE OF CORRECTION

PATENT NO.       : 8,704,396 B2                                           Page 1 of 1
APPLICATION NO.  : 13/700571
DATED            : April 22, 2014
INVENTOR(S)      : Leijon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 6 days.

Signed and Sealed this
Twenty-ninth Day of September, 2015

Michelle K. Lee
*Director of the United States Patent and Trademark Office*